United States Patent
Ouimette et al.

(10) Patent No.: US 9,531,877 B1
(45) Date of Patent: Dec. 27, 2016

(54) PACING OUTBOUND COMMUNICATIONS THAT GENERATE INBOUND COMMUNICATIONS

(71) Applicant: Noble Systems Corporation, Atlanta, GA (US)

(72) Inventors: Jason P. Ouimette, Berkeley Lake, GA (US); Christopher S. Haggerty, Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 14/884,877

(22) Filed: Oct. 16, 2015

(51) Int. Cl.
  *H04M 3/00* (2006.01)
  *H04M 5/00* (2006.01)
  *H04M 3/51* (2006.01)

(52) U.S. Cl.
  CPC ............ *H04M 3/5158* (2013.01); *H04M 3/51* (2013.01); *H04M 3/5191* (2013.01); *H04M 2203/402* (2013.01)

(58) Field of Classification Search
  CPC ........ G10L 15/00; G06Q 10/06; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 2203/2011; H04M 2203/2061; H04M 2242/00; H04M 2242/08; H04M 2242/12
  USPC ......... 379/210.01, 265.01, 265.02, 265.03,379/265.04, 265.05, 265.06, 265.07, 265.08,379/265.09, 265.1, 265.11, 265.12, 265.13,379/265.14, 266.01, 266.02, 266.03, 266.04,379/266.05, 266.06, 266.07, 266.08, 266.09,379/266.1
  See application file for complete search history.

(56) References Cited

U.S. PATENT DOCUMENTS

| | | | | |
|---|---|---|---|---|
| 5,214,688 A | * | 5/1993 | Szlam | H04M 3/36 379/111 |
| 5,247,569 A | * | 9/1993 | Cave | H04M 3/36 379/112.01 |
| 5,295,184 A | * | 3/1994 | Smith | H04M 3/36 379/216.01 |
| 5,309,505 A | * | 5/1994 | Szlam | H04M 3/36 379/162 |

(Continued)

OTHER PUBLICATIONS

Noble Systems Corporation, Harmony Version 4.1 User Manual, Sep. 2, 2015, 514 pages, Noble Systems Corporation, Atlanta, GA.

Primary Examiner — Khai N Nguyen

(57) ABSTRACT

Various embodiments of the invention provide methods, systems, and computer program products for pacing outbound communications that generate inbound communications. A number of outbound communications is set to be sent during a first time period and a number of inbound communications expected to be received as a result of sending the outbound communications is determined based on historical data along with a second time period during which the inbound communications are expected to be received. Accordingly, a present capacity is determined during the first time period with respect to one or more resources that are to be used during the second time period to handle the number of inbound communications expected to be received. A determination is made as to whether the (Continued)

present capacity is at an acceptable level and if so, then the outbound communications are sent.

21 Claims, 4 Drawing Sheets

(56) References Cited

U.S. PATENT DOCUMENTS

| | | | | |
|---|---|---|---|---|
| 5,511,112 A * | 4/1996 | Szlam | ............... | H04M 3/36 379/162 |
| 5,586,179 A * | 12/1996 | Stent | ............... | H04M 3/5158 379/242 |
| 5,790,650 A * | 8/1998 | Dunn | ............... | H04M 3/5158 379/265.03 |
| RE36,416 E * | 11/1999 | Szlam | ............... | H04M 3/36 374/112 |
| 5,978,465 A * | 11/1999 | Corduroy | ............... | H04M 3/51 379/243 |
| 6,574,605 B1 * | 6/2003 | Sanders | ............... | G06Q 10/063112 379/265.01 |
| 7,035,927 B2 * | 4/2006 | Flockhart | ............... | H04M 3/5158 379/265.01 |
| 7,095,841 B2 * | 8/2006 | Mullen | ............... | G06Q 10/06311 379/265.1 |
| 8,254,555 B1 * | 8/2012 | Noble, Jr. | ............... | H04M 3/5158 379/265.01 |
| 8,259,924 B2 * | 9/2012 | Korolev | ............... | H04M 3/5141 379/265.05 |
| 8,391,466 B1 * | 3/2013 | Noble, Jr. | ............... | H04M 3/5238 379/265.01 |
| 8,553,873 B1 * | 10/2013 | Noble, Jr. | ............... | H04M 3/5238 379/265.01 |
| 8,843,563 B1 | 9/2014 | Hartman | | |
| 9,060,254 B2 | 6/2015 | Segall et al. | | |
| 2003/0163343 A1 * | 8/2003 | Meiser | ............... | G06Q 30/02 705/1.1 |
| 2003/0177231 A1 * | 9/2003 | Flockhart | ............... | H04M 3/5158 709/225 |
| 2003/0185378 A1 * | 10/2003 | Mullen | ............... | G06Q 10/06311 379/265.01 |
| 2011/0069821 A1 * | 3/2011 | Korolev | ............... | H04M 3/5141 379/88.04 |
| 2013/0083916 A1 * | 4/2013 | Flockhart | ............... | H04M 3/5232 379/265.12 |

* cited by examiner

US 9,531,877 B1

PACING OUTBOUND COMMUNICATIONS THAT GENERATE INBOUND COMMUNICATIONS

BACKGROUND

In today's world contact centers are beginning to use a wide range of channels of communication in addition to telephone calls to interact with individuals such as SMS text messages, Web chats, email, IM messaging, etc. A channel of communication is understood to be a particular medium used for communicating. Traditionally, a contact center would place an outbound communication using a channel of communication with the intent of reaching the intended party with the outbound communication and conversing with the party over the outbound communication. For example, a contact center would traditionally place an outbound telephone call to an intended party with the intent of having the intended party answer the outbound call and then conversing with the intended party over the outbound call.

However, because of these new channels of communication that are now available to a contact center, a contact center can place an outbound communication to an intended party with the intent of receiving an inbound communication from the intended party during a time that may be more convenient for the intended party. For example, a contact center can send an SMS text message to an intended party about a new product offering and the message may inform the party to place a call to the contact center at a time that is convenient if the party has any questions about the new product offering and/or to purchase the new product offering. Accordingly, a contact center can now place (send out) outbound traffic (communications) over a time period that may generate inbound traffic (communications) during the same time period or at a time later than the time period.

However with that said, a contact center must consider whether it will have the proper resources available to handle the generated inbound traffic when placing such outbound traffic. Therefore, a need in the art exists for processes configured to properly pace outbound communications that generate inbound communications. It is with respect to these considerations and others that the disclosure herein is presented.

BRIEF SUMMARY

In general, embodiments of the present invention provide computer program products, methods, systems, apparatus, and computing entities for pacing outbound communications that generate inbound communications for a contact center. For example, the contact center may send outbound SMS text messages to various parties requesting each party to reply to the SMS text message by sending a returning SMS text message to the contact center or by calling into the contact center.

Accordingly, in various embodiments, a number of outbound communications is set to be sent during a first time period and a number of inbound communications expected to be received as a result of sending the outbound communications is determined based on historical data of outbound communications sent during a prior time period to generate inbound communications. In general, the outbound communications found in the historical data were sent using the same channel of communication as the outbound communications to be sent during the first time period. For example, if the outbound communications are to be sent as emails during the first time period then the outbound communications found in the historical data were sent as emails. Furthermore, a second time period during which the inbound communications are expected to be received by the contact center is determined in various embodiments based on sending the number of outbound communications during the first time period. Depending on the embodiment, at least a portion of the first time period during which the outbound communications are to be sent overlaps with at least a portion of the second time period during which the inbound communications are expected to be received at the contact center. In addition, the second time period may also be determined based on the historical data of outbound communications sent during the prior time period.

At this point, a present capacity of the contact center is determined in various embodiments during the first time period with respect to one or more resources that are to be used during the second time period to handle the inbound communications expected to be received by the contact center. For instance, depending on the embodiment the resources may comprise one or more of agents, trunks, hardware ports, memory, processing capacity, hardware-related licenses, software-related licenses, bandwidth, and the like that are to be used to handle the inbound communications as they are received during the second time period. Accordingly, a determination is made as to whether the present capacity is at an acceptable level to send out the number of outbound communications and if so, then the number of outbound communications are sent using a contact device.

However, if the present capacity is not at an acceptable level, then in particular embodiments a second number of outbound communications is set to send during the first time period that is lower than the initial number of outbound communications. Again, a determination is made as to a second number of inbound communications expected to be received as a result of sending the second number of outbound communications based on the historical data and a determination is made as to whether the present capacity is at an acceptable level to send the second number of outbound communications. If so, then the second number of outbound communications is sent using the contact device. Is not, then the process may be repeated until the present capacity is at an acceptable level to handle the number of inbound communications expected to be received as a result of sending out a particular number of outbound communications.

The subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
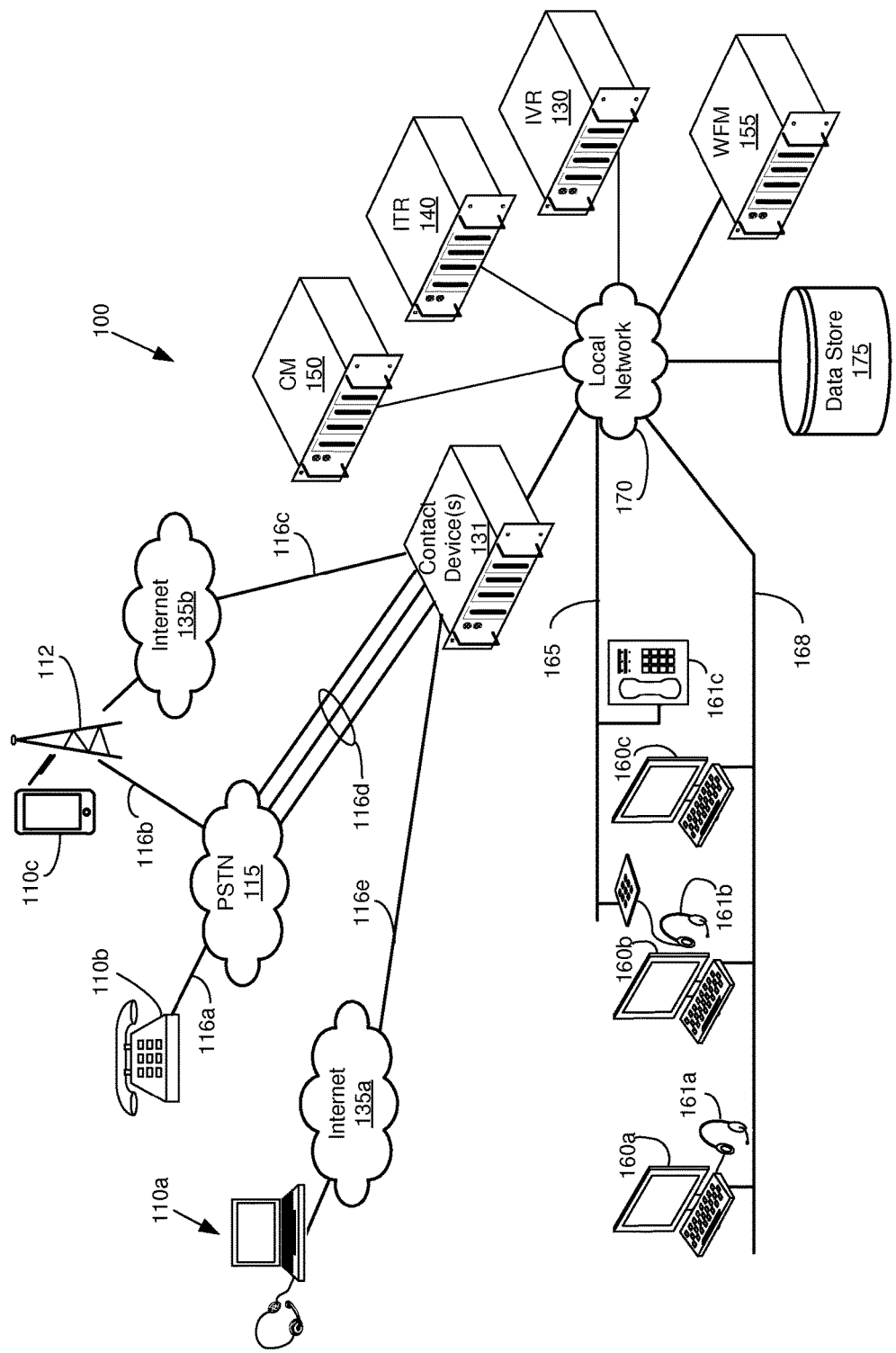
FIG. 1 shows one embodiment of a contact center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 shows one embodiment of a contact center architecture 100 illustrating the various technologies disclosed herein. The contact center architecture 100 shown in FIG. 1 may process various channels of communication such as voice calls, facsimiles, emails, text messages, video calls, Web chats, etc. that generally make up a combination of both inbound and outbound traffic (sometimes referred to as a "blended" contact center). In particular instances, the contact center may be referred to as a call center. However, for purposes of this disclosure, the term "contact center" is used throughout, although it is understood that the two are synonymous.

With that said the contact center may handle communications originating from a remote party or initiated to a remote party. Thus, the term "party," without any further qualification, refers to an individual associated with a communication processed by the contact center, where the communication is either received from or placed to the party.

Depending on the embodiment, communications may originate to or be received from parties that use a variety of different devices. For instance, a party may receive or place a voice call using a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of communications.

In addition, a party may receive or place a communication using a device such as a desktop or laptop computer 110a, a smart phone 110c, mobile phone, tablet, or other mobile device. Depending on the device, these communications may be placed or received via an Internet provider 135a, 135b and/or wirelessly via a mobile service provider ("MSP") 112. For instance, communications may be routed to the PSTN 115 using an integrated services digital network ("ISDN") interface 116b or other type of interface that is well known to those skilled in the art. While in other instances, the MSP 112 may route communications as packetized data to/from an Internet provider 135b using Internet-based protocols. For convenience, unless indicated otherwise, the term "trunk" refers to any type of facility 116c, 116d, or 116e providing communication to, or from, the contact center, regardless of the type of protocol or technology used. Specifically, a "trunk" is not limited to time-division multiplexing ("TDM") technology. Those skilled in the art will recognize that a variety of protocols and facilities may be used to convey communications.

Accordingly, the contact center may implement various contact devices 131 for initiating and receiving communications based on the channel of communication. For instance, in various embodiments, communications such as inbound calls and/or inbound SMS text messages are received from parties by a contact device 131 such as an automatic call distributor ("ACD"). In particular embodiments, the ACD may be a specialized switch for receiving and routing inbound calls and/or text messages under various conditions. Further, the ACD may be embodied as a dedicated form of equipment readily available from various manufacturers, or the ACD may be a so-called "soft switch" comprising a suitable programming module executed by a processing device to perform the necessary functions. The ACD may route an incoming call and/or text message over contact center facilities 165, 168 to an available agent. Depending on the embodiment, the facilities 165, 168 may be any suitable technology for conveying the call and/or message, including but not limited to a local area network ("LAN"), wide area network ("WAN"), ISDN, and/or conventional TDM circuits. The exact details typically depend in part on the technology used. For example, in one embodiment, first facilities 165 may be analog or proprietary voice communication technology whereas second facilities 168 may be SIP oriented. As may be appreciated, there are various technologies and configurations that are possible. In addition, the facilities 165, 168 may be the same or different from the facilities used to transport the call and/or message to the ACD.

Depending on the embodiment, the ACD may place a call and/or text message in a queue if there is no suitable agent available. Further, the ACD may route a call to an interactive voice response system ("IVR") 130 to play voice prompts and/or may route a text message to an interactive text response system ("ITR") 140 to send message prompts. Depending on the embodiment, these prompts may solicit information from the party and the IVR 130 and/or ITR 140 may collect and analyze responses from the party in the form of dual-tone multiple frequency ("DMTF") tones, speech, and/or text. In addition, the IVR 130 and/or ITR 140 may be used to further identify the purpose of the call or text message, such as, for example, prompting the party to provide account information or otherwise obtain information used to service the call or text message. Further, in particular embodiments, the IVR 130 and/or ITR 140 may interact with other components, such as a data store 175, to retrieve or provide information for processing the call or text message.

Continuing on, in various embodiments, communications such as outbound calls and/or outbound SMS text messages may be sent using another contact device 131 such as a dialer (e.g., predictive dialer). Again, the dialer may be embodied as a dedicated form of equipment readily available from various manufacturers, or the dialer may be a so-called "soft switch" comprising a suitable programming module executed by a processing device to perform the necessary functions. Accordingly, a predictive dialer is a type of dialer that may originate calls and/or text messages to multiple telephone numbers simultaneously with the expectation that agents will be available to handle one or more of the calls that are answered and/or text messages that are responded to. In various embodiments, the predictive dialer makes use of one or more algorithms to determine how and when to dial/text numbers so as to minimize the likelihood of a party being placed in a queue while maintaining target agent utilization.

Once a call is answered or a text message is responded to by a party, the dialer may connect the call or direct the text message to an available agent using one or more facilities 165, 168. Other types of dialing methods may be used such as preview dialing in which information about an account is displayed to an agent to review prior to the dialer originating a call or text message to the account. In this way, when the party answers the call or responds to the text message, the agent can interact with the party in an effective way. The dialer may also originate a call or text message and connect the call to the IVR 130 or direct the text message to the ITR 140 for processing upon the party answering the call or responding to the text message. Further, in particular embodiments, the dialer may be configured so that it attempts to establish communication with parties using a calling/texting list of telephone numbers that is stored in a data store 175.

Depending on the embodiment, other contact devices 131 may be used for originating and/or receiving other channels of communication such as Web chats, emails, SMS text messages, etc. For example, the contact center may make use of a web server to host Web pages and interact with parties via Web chats. In addition, the contact center may make use of an email server to receive and send emails from parties. While in other embodiments, the contact center may convey and/or receive SMS text messages to/from a gateway instead of an ACD or dialer, which then conveys the messages to the Internet 135b and on to a mobile service provider 112. In these particular embodiments, such a gateway may provide a way for the contact center to send and/or receive SMS text messages that are not in a native SMS protocol and can be accepted or conveyed by the mobile service provider 112.

Again, information associated with these other channels of communication may be stored in the data store 175. In addition, like calls, a transfer-like operation may be used in various embodiments to connect a communication that has been answered and/or received with an available agent, or if an agent is not available, a queueing operation may be used to place the communication in a queue until an agent is available.

In addition, in various embodiments, the contact center may make use of a campaign monitoring system ("CM") 150 to monitor active campaigns and to direct the contact devices 131 on pacing outbound communications to various parties. Depending on the embodiment, the CM 150 may keep track of various resources used to handle communications and pace outbound communications accordingly. For instance, the contact center may wish to send out SMS text messages to multiple parties requesting reply SMS text messages from the parties and the CM 150 may determine when and how many such SMS text messages should be sent based on the availability of resources to handle the reply SMS text messages sent from the parties and direct the corresponding contact device 131 to send the SMS text messages accordingly.

With that said, an agent at the contact center typically uses a computing device 160a-160c, such as a personal computer, and a voice device 161a-161c to handle communications. The combination of computing device 160a-160c and voice device 161a-161c may be referred to as a "workstation." However, in particular embodiments, the computing device 160a-160c may also handle voice (e.g., VoIP) or voice capabilities may not be needed so that reference to an agent's "workstation" may only refer to a computing device 160a-160c without the use of a separate voice device 161a-161c.

Agents typically log onto their workstations prior to handling communications and this allows the contact center to know which agents are available to potentially receive communications. In particular embodiments, the contact center may also maintain information on each agent's skill level that may be used to route a specific communication to an agent or group of agents having the same skill level. In particular instances, if a suitable agent is not available to handle a particular communication, the contact center (e.g., the contact device 131) may queue the communication for the next available suitable agent.

Depending on the embodiment, interaction between a contact device 131, as well as other components within the contact center architecture 100, and agent's workstation may involve using a local area network ("LAN") 170. In addition, in particular embodiments, an agent may interact with components that provide information to the agent's workstation. For example, when a communication is directed to an agent, information about the party on the communication may be presented to the agent's computer device 160a-160b over the LAN 170 using facility 168.

Finally, another component that is employed in the contact center architecture 100 shown in FIG. 1 is a workforce management system ("WFM") 155. In various embodiments, the WFM 155 maintains information and generates agents' schedules to effectively handle inbound/outbound communications. For instance, in particular embodiments, the WFM 155 maintains historical communication volume information for various types of communication campaigns and generates forecasts for expected communication volume based on the historical information to predict the number of agents needed to handle the communication volume at a defined service level. The WFM 155 then applies the forecasts and information about available agents to generate work rosters of agents (e.g., schedules). That is to say, the WFM 155 schedules agents for work shifts according to the anticipated needs of the communication campaigns.

Although a number of the above entities may be referred to as a "component," each may also be referred to in the art as a "computing device," "unit," "server," or "system." A component may incorporate a local data store and/or interface with an external data store. Use of the word "server" does not necessarily require the component to interact in a formal client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in the art will recognize FIG. 1 represents one possible configuration of a contact center architecture 100, and variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Pacing Module

Figure 2:
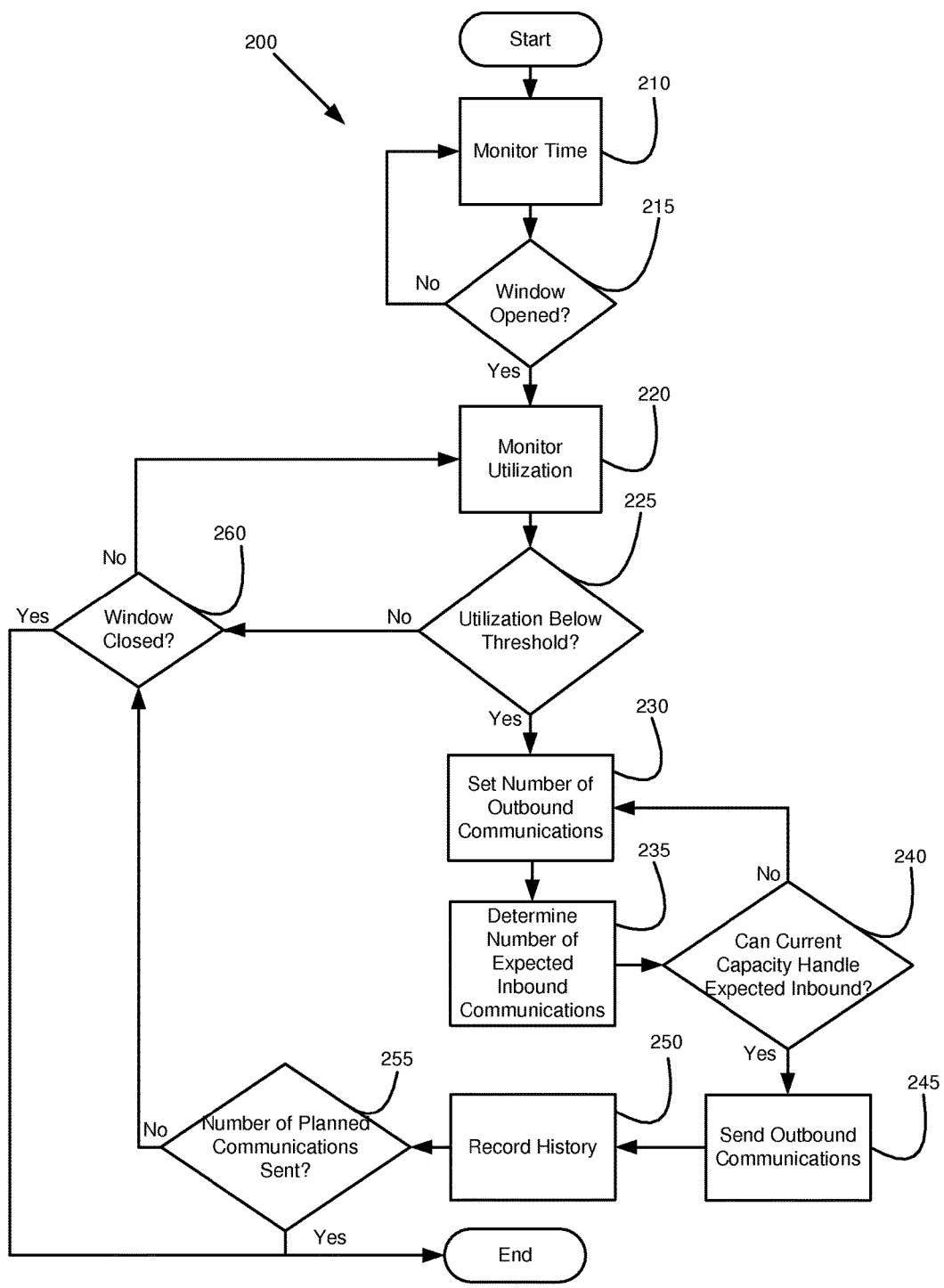
FIG. 2 is a flowchart illustrating a pacing module that can be used in accordance with various embodiments of the present invention.

Turning now to FIG. 2, additional details are provided regarding the process flow for pacing outbound communications that generate inbound communications. In particular, FIG. 2 is a flow diagram showing a pacing module for performing such functionality according to various embodiments of the invention. For example, the flow diagram shown in FIG. 2 may correspond to operations carried out by one or more processors in one or more components, such as, for example, a contact device 131 like an ACD, a dialer, or gateway or the CM 150, as it executes the pacing module stored in the component's volatile and/or nonvolatile memory.

An example is now provided to help facilitate the reader's understanding of the pacing module. However, it should be understood that this example is provided for clarification purposes only and should not be construed to limit the scope of the invention. In the example, a contact center is scheduled to conduct a campaign in which SMS text messages are to be sent to a number of a banking institution's customers advising them of a new savings product the banking institution is beginning to provide. In addition, the SMS text messages advise each customer to reply to the SMS text message via a return SMS text message or telephone call if the customer is interested in setting up an account under the new savings product. Therefore, the campaign is directed to sending outbound communications (i.e., outbound SMS text messages) that generate inbound communications (i.e., inbound SMS text messages and telephone calls). The banking institution has provided the contact center with contact information for one-thousand customers to be contacted during the campaign and the campaign is to be conducted on a particular Saturday during the month of August.

In addition to above-mentioned campaign, the contact center is also conducting a second campaign at the same time during this Saturday in August that involves handling inbound customer service telephone calls for the banking institution. Therefore, the contact center initially schedules a number of agents to work on the particular Saturday to handle the two campaigns. For instance, in particular embodiments, the contact center schedules a certain number of agents based on a forecast predicting the number of inbound customer service telephone calls and the number of inbound SMS text messages and telephone calls the contact center is expected to receive for the two campaigns on the particular Saturday. A process for generating such a schedule is disclosed in U.S. patent application Ser. No. 14/884,823 filed Oct. 16, 2015, and entitled "Scheduling Campaigns Involving Sending Outbound Communications that Generate Inbound Communications," the contents of which are incorporated by reference for all that they teach.

Depending on the circumstances, the contact center generally identifies a time period (e.g., a time window) when the SMS text messages should ideally be sent to the one-thousand customers in constructing the schedule for the particular Saturday. For instance, the contact center may identify a single time to ideally send all of the SMS text messages as a batch and then identify a "closing" time in which after this time, no further SMS text messages should be sent. Accordingly, the contact center would generate the schedule based on sending the SMS text messages at the ideal time, but no later than the "closing" time. While in other instances, the contact center may identify separate times to send the SMS text messages for particular customers based on, for example, determined best times to send the SMS text messages to the customers. In these instances, the span over which these separate times occur could be viewed as the time window for sending the SMS text messages. Yet in other instances, the contact center may not make use of a time window at all and simply identify a single time to send the SMS text messages. However, whatever process used for identifying the times to send the SMS text messages, such identification helps the contact center to schedule the appropriate number of agents to be available to handle the inbound SMS text messages and telephone calls when they are expected to be received as a result of sending the SMS text messages.

With that said, the number of agents available to handle the inbound SMS text messages and telephone calls during the time the campaigns are actually being conducted may be different than what was expected to be available at that time when the schedule was created. For example, the contact center may have identified 1:00 p.m. as the ideal time to send the SMS text messages to the one-thousand customers and based on forecasting with sending the SMS text messages at that time, scheduled three-hundred agents to work during the particular Saturday. However, at 1:00 p.m. on the particular Saturday, the actual number of agents who are available and/or who will become available to handle the inbound SMS text messages and telephone calls as they are received may be lower than expected. Therefore, the contact center may not wish to send all one-thousand SMS text messages at 1:00 p.m. and instead may wish to send only a fraction of the SMS text messages at that time and wait for more appropriate times to send the remainder of the SMS text messages. Accordingly, the contact center may make use of the pacing module to accomplish this task and ensure the SMS text messages are sent to the one-thousand customers at appropriate times when an acceptable number of agents will be available to handle the inbound telephone calls and SMS text messages as they are received.

Turning now to FIG. 2, the pacing module begins the process 200 of pacing the SMS text messages by monitoring the time in Operation 210. As noted above, the contact center has identified 1:00 p.m. as the time the SMS messages ideally should be sent out to the one-thousand customers. That is to say, the contact center has identified 1:00 p.m. as the time when the time window for sending the outbound SMS text messages opens. Thus, in this instance, the pacing module monitors the time and makes a determination in Operation 215 as to whether the time window has opened. It should be noted that in particular embodiments, the contact center may identify the opening of the time window to be prior to 1:00 p.m. so that the pacing module has time to make a determination as to whether to send the SMS text messages at 1:00 p.m.

If the time window has not opened, then the pacing module continues to monitor the time. However, if the time window has opened (e.g., the time has reached 1:00 p.m.), then the pacing module monitors the contact center's present utilization of one or more resources as an indicator of whether the present capacity of the contact center is at a level that can handle the inbound calls and SMS text messages expected to be received from sending out the SMS text messages to the one-thousand customers in Operation 220.

In this instance, the contact center's measure of the present utilization is with respect to the utilization of agents currently working the two campaigns. Generally speaking, agent utilization is a representation of how many agents are being "utilized" and thus unavailable to handle inbound and/or outbound communications as opposed to how many agents are idle and available to handle such communications. Thus, in these particular embodiments, agent utilization is used to gauge the number of agents that are currently available and/or will become available to handle the inbound calls and SMS text messages that result from sending out the SMS text messages to the customers for the first campaign and to handle the inbound customer service calls for the second campaign. Depending on the embodiment, utilization of other types of resources may be considered in addition to or instead of agents such as, for example, utilization of trunks, hardware ports, memory, processing capacity, bandwidth, and/or applicable hardware/software-related licenses.

Here, the contact center has established a threshold value of seventy-five percent of agent utilization as a point identifying when the present capacity is at a level to support sending SMS text messages to at least some of the one-thousand customers. More specifically, the contact center has established that when agent utilization falls below the threshold value of seventy-five percent, then SMS text messages may be sent to at least some of the one-thousand customers. Accordingly, the pacing module determines whether the agent utilization is below the threshold in Operation 225. If not, then the pacing module determines whether the time window has closed in Operation 260. If the pacing module determines the time window for sending the SMS text messages has not closed, then the module continues to monitor the present utilization of agents in Operation 220.

However, if the present utilization of agents is below seventy-five percent, then the pacing module sets the number of outbound communications in Operation 230. In this instance, since this is the first occurrence of sending SMS text messages to some of the customers, the pacing module sets the number of SMS text messages to one-thousand. That is to say, the pacing module sets the number of SMS text messages to the maximum number of outbound communications that need to be sent since the communications are ideally to be sent to all one-thousand customers at one time.

At this point, the pacing module determines the number of inbound communications expected to be received as a result of sending the SMS text messages in Operation 235. In particular embodiments, the number of inbound communications expected to be received may have been previously determined and the pacing module simply queries the number from some component or storage media within the contact center architecture 100. While in other embodiments, the pacing module is configured to determine the number in real-time.

Figure 3:
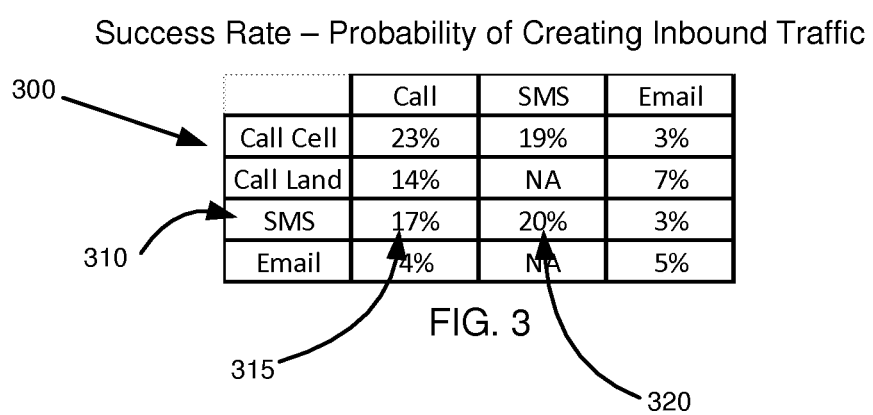
FIG. 3 is a chart providing success rates for different channels of communication.

Thus, turning briefly to FIG. 3, a table 300 is shown providing the historical success rate at creating inbound traffic (communications) using different channels (types) of outbound communication with respect to different channels of inbound traffic. Such information may be stored and accessed by the pacing module from any number of different storage media depending on the contact center architecture 100. The first column found on the left side of the table 300 represents the channel of outbound communication to be sent. In this instance, the contact center is interested in sending SMS text messages 310. Accordingly the first row along the top of the table 300 represents the channel of inbound communication received in response to the outbound communication. Therefore historically, the contact center has received inbound calls for seventeen percent 315 of outbound SMS text messages sent to customers and inbound SMS text messages for twenty percent 320 of outbound SMS text messages sent to customers. Since the SMS text messages being sent to the one-thousand customers provides the option of replying via call or SMS text messages, the pacing module for this particular embodiment is configured to use the average of the two historical values. Therefore, the pacing module determines the contact center can expect to receive inbound communications for eighteen and a half percent of the SMS text messages sent to the customers (i.e., (17%+20%)/2=18.5%).

Furthermore, the pacing module for this particular embodiment also considers historical data with respect to which type of communication customers prefer to use when given the option between replying via a call or SMS text message. Again, such information may be stored and accessed by the pacing module from any number of different storage media depending on the embodiment. Historically, seventy-five percent of customers reply via a SMS text message when given the choice of replying via a call or SMS text message. Therefore, the pacing module determines the contact center can expect to receive forty-six calls and one-hundred and thirty-nine SMS text messages from sending the outbound SMS text messages to the one-thousand customers (i.e., 1000 outbound SMS text message*18.5%=185 inbound communications, 185 inbound communications*25%=46 inbound calls, 185 inbound communications*75%=139 inbound SMS text messages).

For this particular embodiment, the contact center assumes the times for customers sending replies after receiving the SMS text messages adheres to a normal probability distribution. In this instance, the mean reply time for receiving a SMS text message after sending a customer a SMS text message is sixteen minutes with a standard deviation of four minutes. Therefore, the pacing module determines the contact center can expect to receive one-hundred and thirty-two of the one-hundred and thirty-nine SMS text message replies between eight minutes and twenty-four minutes after sending the SMS text messages to the one-thousand customers. That is to say under a normal probability distribution, ninety-five percent of the distribution lies within two standard deviations from the mean. Therefore, 95%*139 inbound SMS text messages=132 inbound SMS text messages expected to be received between 2 STD of the mean=16 minutes−8 minutes and 16 minutes+8 minutes or between 8 minutes and 24 minutes of sending the SMS text messages to the one-thousand customers.

Likewise, the mean reply time for receiving a call after sending a customer a SMS text message is thirty-three minutes with a standard deviation of seven minutes. Therefore, the pacing module determines the contact center can expect to receive forty-four of the forty-six call replies between nineteen minutes and forty-seven minutes after sending the SMS text messages to the one-thousand customers. That is to say under a normal probability distribution, 95%*46 inbound calls=44 inbound calls expected to be received between 2 STD of the mean=33 minutes−14 minutes and 33 minutes+14 minutes or between 19 minutes and 47 minutes of sending the SMS text messages to the one-thousand customers. The end result of the two above calculations is the pacing module determines the contact center can expect to receive one-hundred and seventy-six inbound communications between eight minutes and forty-seven minutes of sending the SMS messages to the one-thousand customers.

At this point, the pacing module determines whether the present capacity of the contact center can handle the expected volume of inbound traffic (e.g., inbound calls and SMS text messages) in Operation 240. In this instance, the contact center currently has three-hundred agents working and the current agent utilization is seventy-four percent. The calculation for this particular embodiment with respect to the number of communications that can be handled over the next forty-seven minutes equals the number of agents available plus the number of agents that will become available minus the number of agents needed to handle the customer service inbound calls received for the second campaign during this time.

The number of agents currently idle and available is seventy-eight (300 agents*26%=78 agents). While the number of agents currently handling communications is one-hundred and three and the number of agents currently engaged in wrap-up work is sixty-two. Wrap-up work entails work performed by an agent after fielding a communication to handle any remaining aspects of the communication. For instance, wrap-up work may entail an agent entering/recording a resolution or conclusion for the communication. While in another instance, wrap-up work may entail the agent providing needed information to complete a transaction that occurred during the communication such as, for example, a sale of a product or the opening of a bank account. Those of ordinary skill in the art can envision many other types of tasks that may be considered wrap-up work in light of this disclosure. Finally, the number of agents needed to handle the customer service inbound calls expected to be received for the second campaign during the forty-seven minutes is ninety-four. (The remaining agents of the three-hundred agents working may be engaged in some other activity that makes them unavailable such as, for example, they may be on a lunch break or attending a training session.)

Depending on the embodiment, the pacing module may gather this information from different sources within the contact center. For example, in particular embodiments, the pacing module may query the active contact device(s) 131 and/or the CM 150 to gather information on the current status of each of the three-hundred agents currently working. Further, the pacing module may query the WFM 155 to gather information on the number of inbound customer service calls expected during the forty-seven minutes.

Thus, once the pacing module has gathered all of the needed information, the pacing module determines the number of agents available to handle the inbound calls and SMS text messages expected to be received as a result of sending the SMS text messages to the one-thousand customers. Specifically, in this particular embodiment, the pacing module determines the number of agents available to field the expected inbound traffic (inbound calls and SMS text messages) from sending the SMS text messages by using formula shown in Eq. 1:

$$AFIBT = IA + AFC + AWW - AFOC \text{ where:} \qquad \text{Eq. 1}$$

AFIBT=agents available to field the inbound traffic expected from sending the outbound communications;
IA=idle agents;
AFC=agents currently fielding communications;
AWW=agents currently engaged in wrap-up work;
AFOC=agents needed to field communications for other campaign(s).

Therefore, the pacing module calculates the number of agents available to field the inbound traffic (calls and SMS text messages) expected from sending the SMS text messages is one-hundred and forty-nine (i.e., 78 IA+103 AFC+62 AWW−94 AFOC=149 AFIBT). In this instance, the number of inbound communications (calls and SMS text messages) the contact center expects to receive in the first forty-seven minutes after sending out the SMS text messages to the one-thousand customers is one-hundred and seventy-six. Thus, it appears as though the contact center has a shortage of agents to field the inbound communications that are expected to be received as a result from sending out SMS text messages to the one-thousand customers at 1:00 p.m.

However, some agents may field a first communication during the forty-seven minutes and become available in time to field a second communication during the forty-seven minutes. For example, the average handle time for an agent to field a call at the contact center may be fifteen minutes and the average handle time for an agent to field an SMS text message at the contact center may be nineteen minutes. Accordingly in particular embodiments, the contact center may set a threshold value to allow for a short-fall to exist to account for such occurrences. For example, the contact center may set the threshold at twenty percent of the expected communications. Therefore, the contact center allows for a short-fall of agents to field the inbound communications as long as the short-fall is less than twenty percent of the expected communications to be received. In this instance, the short-fall is twenty-seven agents (i.e., 176 inbound communications−149 AFIBT=27 agents short-fall). Thus, the pacing module determines the short-fall of twenty-seven agents is within the threshold value of thirty-five (i.e., 176 inbound communications*20%=35 short-fall threshold value) and therefore the present capacity can handle the inbound communications expected to be received as a result of sending SMS text messages to the one-thousand customers at 1:00 p.m.

Accordingly, returning to FIG. 2, the pacing module sends out the SMS text messages to the one-thousand customers in Operation 245. Depending on the embodiment, the pacing module may be installed on a component configured to facilitate sending the SMS text messages to the one-thousand customers such as a contact device 131 or may be installed on a component configured to direct another component to send out the SMS text messages such as the CM 150. In turn, the pacing module also records information on sending the SMS text messages to the one-thousand customers for historical purposes in Operation 250. For instance, the pacing module may record what customers were sent a SMS text message, what time the SMS text messages were sent, what campaign is associated with the SMS text messages, etc. By recording such information, the contact center will have historical data of sending the SMS text messages that can be later referenced for various purposes such as forecasting.

At this point, the pacing module determines whether the number of planned communications has been sent in Operation 255. Returning to the example, the number of planned SMS text messages to be sent was one-thousand. Therefore, since all one-thousand SMS text messages were sent at 1:00 p.m., the pacing module determines that the number of planned communications has been sent. Accordingly, the process 200 then ends.

However with that said, returning to Operation 240, if the number of agents needed to field the inbound customer service calls for the second campaign was one-hundred and ninety-four instead of ninety-four, then the agents available to field the inbound traffic (inbound calls and SMS text messages) expected to be received from sending out the SMS text messages to the one-thousand customers would be forty-nine instead of one-hundred and forty-nine. Accordingly, the short-fall of agents would be well over the twenty percent threshold at one-hundred and twenty-seven agents (i.e., 176 inbound communications−49 AFIBT=127 agents short-fall). Therefore, in this instance, the pacing module would determine that the present capacity of the contact center cannot handle the inbound traffic expected to be received as a result of sending SMS text messages to the one-thousand customers at 1:00 p.m.

As a result, the pacing module returns to Operation 230 and sets a lower number of outbound communications to send out at 1:00 p.m. Depending on the embodiment, the pacing module may be configured to set the new number of outbound communications using different criteria. For instance, in one embodiment, the pacing module may be configured to set the number of outbound communications to offset the short-fall of agents. For example, the pacing module may be configured to use the formula shown in Eq. 2:

$$NOC=PNOC-((PNOC*SFA)/ENIC), \text{ where:} \qquad \text{Eq. 2}$$

NOC=number of communications;
PNOC=previous number of communications;
SFA=short-fall of agents;
ENIC=expected number of inbound communications for previous number of communications.

Thus, in this example, the pacing module would set the number of communications to two-hundred and seventy-eight (i.e., 1000 PNOC−((1000 PNOC*127 SFA)/176 ENIC)=278 NOC). While in another embodiment, the pacing module may be configured to simply set the number of outbound communications by incrementally lowering the previous number of outbound communications by some percentage such as fifty, twenty, or ten percent for example. Those of ordinary skill in the art can envision other criteria that may be used by the pacing module in setting the new number of outbound communications in light of this disclosure.

Accordingly, upon the pacing module setting the new number of outbound SMS text messages to be sent to two-hundred and seventy-eight, the pacing module proceeds to Operation 235 and determines the number of inbound calls and text messages expected to be received as a result of sending SMS text messages to two-hundred and seventy-eight customers. Again, the pacing module determines a total of fifty-one inbound communications (i.e., 278 outbound SMS text messages*18.5%=51 inbound communications) with thirty-eight of the communications being SMS text messages (i.e., 51 inbound communications*75%=38 inbound SMS text messages) and thirteen of the communications being calls (i.e., 51 inbound communications*25%=13 inbound calls).

Next, the pacing module determines whether the present capacity of the contact center can handle the volume of inbound traffic (e.g., inbound calls and SMS text messages) expected to be received from sending SMS text messages to the two-hundred and seventy-eight customers in Operation 240. As previously mentioned, the contact center currently has three-hundred agents working and the current agent utilization is now seventy-one percent. Accordingly, the number of agents currently idle and available is sixty-three (i.e., 300 agents*29%=87 agents). While the number of agents currently handling communications is one-hundred and twenty and the number of agents currently engaged in wrap-up work is thirty-four. Finally, as mentioned above, the number of agents needed to handle the customer service inbound calls expected to be received for the second campaign during the forty-seven minutes is one-hundred and ninety-four. Thus, the pacing module calculates the number of agents available to field the inbound traffic (inbound calls and SMS text messages) from sending the SMS text messages is forty-seven (i.e., 87 IA+120 AFC+34 AWW−194 AFOC=47 AFIBT).

In this instance, the short-fall is four agents (i.e., 51 inbound communications−47 AFIBT=4 agents short-fall). Thus, the pacing module determines the short-fall of four agents is within the threshold value of ten (i.e., 51 inbound communications*20%=10 threshold short-fall value) and therefore the present capacity can handle the inbound communications expected to be received as a result of sending SMS messages to the two-hundred and seventy-eight customers at 1:00 p.m.

Accordingly, the pacing module sends out the SMS text messages to the two-hundred and seventy-eight customers in Operation 245 and records information on sending the SMS text messages for historical purposes in Operation 250. Depending on the embodiment, the pacing module may select the two-hundred and seventy-eight customers to receive the initial SMS text messages based on different criteria. For instance, in one embodiment, the pacing module may simply select the first two-hundred and seventy-eight customers from the list of one-thousand customers to receive the SMS text messages. While in other embodiments, the pacing module may select the two-hundred and seventy-eight customers based on those customers more likely to respond to the SMS text messages based on past history and sending such communications to the customers. Those of ordinary skill in the art can envision various criteria that may be used by the pacing module in selecting the customers to receive the initial SMS text messages in light of this disclosure.

At this point, the pacing module determines whether the number of planned communications has been sent in Operation 255. Therefore, since only two-hundred and seventy-eight of the one-thousand SMS text messages were sent in this instance, the pacing module would determine that the number of planned communications has not been sent. Accordingly, the pacing module then determines whether the window for sending the planned number of communications has closed in Operation 260. For instance, the contact center in the example may have set parameters indicating the campaign involving sending the SMS text messages to the one-thousand customers is to be conducted between the hours of 1:00 p.m. and 8:00 p.m. on the particular Saturday that was identified. Therefore, the time window for sending the outbound SMS text messages to the one-thousand customers is 1:00 p.m. to 8:00 p.m. and the pacing module determines whether the current time on the particular Saturday is before 8:00 p.m. If so, then the pacing module returns to Operation 220 to monitor the present capacity of the contact center to identify another instance in which SMS text messages can be sent to more of the one-thousand customers. Accordingly, the process 200 continues until SMS text messages have been sent to all one-thousand customers or until the time window closes for conducting the campaign.

Exemplary Processing Device Architecture

Figure 4:
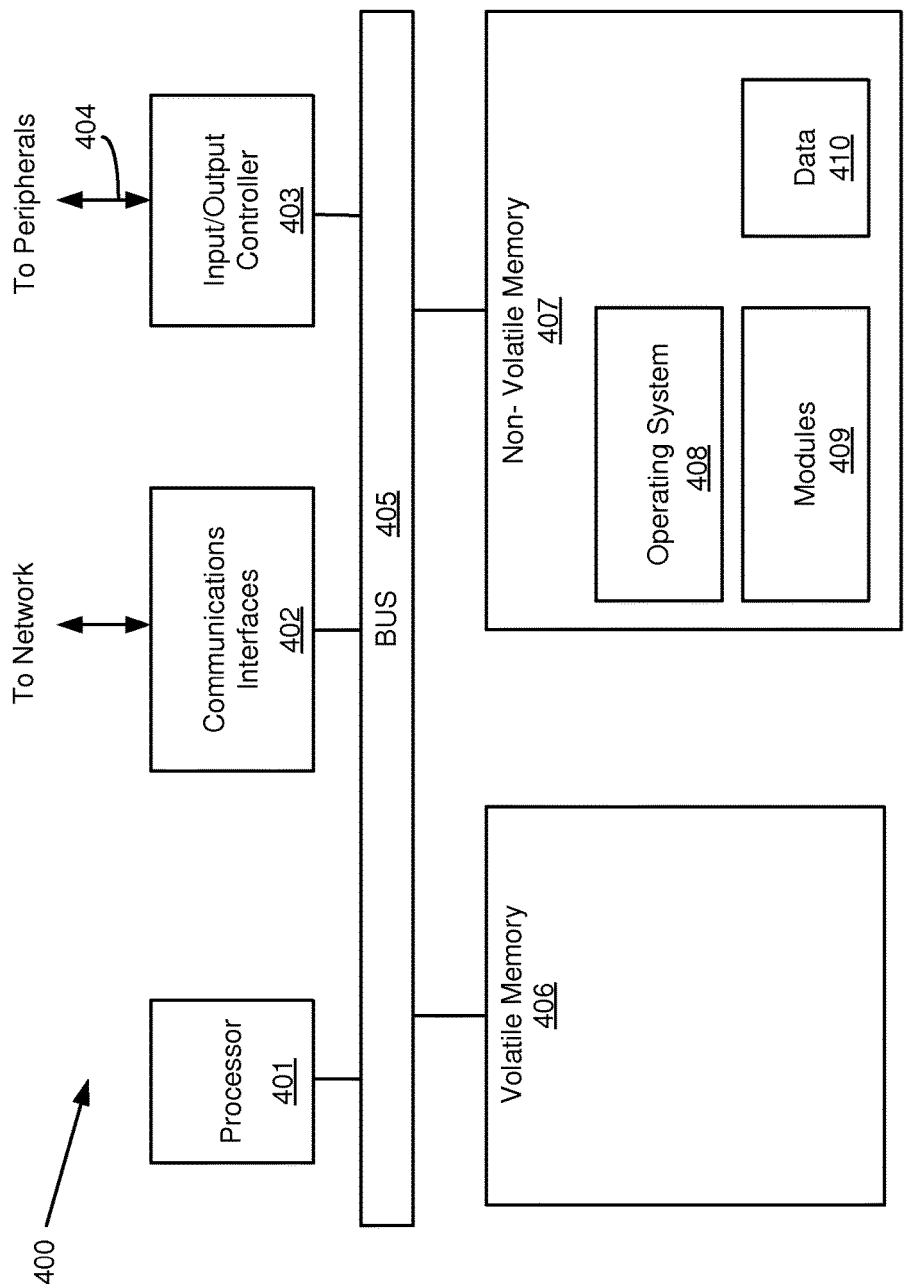
FIG. 4 is an exemplary schematic diagram of a server used in one embodiment of the contact center architecture to practice the technologies disclosed herein.

As discussed in conjunction with FIG. 1, the contact center architecture 100 may comprise various components that comprise a processing system. FIG. 4 is an exemplary schematic diagram of a processing component 400 that may be used in an embodiment of the contact center architecture 100 to practice the technologies disclosed herein such as, for example, the contact device(s) 131, IVR 130, ITR 140, CM 150, WFM 155, or other component previously described. In general, the term "processing component" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 4, the processing component 400 may include one or more processors 3301 that may communicate with other elements within the processing component 400 via a bus 405. The processor 401 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 400 may also include one or more communications interfaces 402 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 403 may also communicate with one or more input devices or peripherals using an interface 404, such as, but not limited to: a keyboard, a mouse, a touch screen/display input, microphone, pointing device, etc. The input/output controller 403 may also communicate with output devices or peripherals, such as displays, printers, speakers, headsets, banner displays, etc.

The processor 401 may be configured to execute instructions stored in volatile memory 406, non-volatile memory 407, or other forms of computer-readable storage media accessible to the processor 401. The volatile memory 406 may comprise various types of memory technologies, including, but not limited to: random access memory ("RAM"), dynamic random access memory ("DRAM"), static random access memory ("SRAM"), and other forms well known to those skilled in the art. The non-volatile memory 407 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 407 may store program code and data, which also may be loaded into the volatile memory 406 at execution time. Specifically, the non-volatile memory 1807 may store one or more program modules 409, such as the pacing module described above containing instructions for performing the processes and/or functions associated with the technologies disclosed herein, and/or operating system code 408. In addition, these program modules 409 may also access, generate, or store data 410, such as the aforementioned records and data, in the non-volatile memory 407, as well as in the volatile memory 406. The volatile memory 406 and/or non-volatile memory 407 may be used to store other information including, but not limited to: records, applications, programs, scripts, source code, object code, byte code, compiled code, interpreted code, machine code, executable instructions, or the like. These may be executed or processed by, for example, the processor 401 and/or may form a part of, or may interact with, the program modules 409.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Conclusion

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for pacing outbound communications that generate inbound communications for a contact center, the method comprising the steps of:

setting a number of outbound communications to send during a first time period;

determining a number of inbound communications expected to be received as a result of sending the number of outbound communications based on historical data of outbound communications sent during a prior time period to generate inbound communications in which the outbound communications found in the historical data were sent using a same channel of communication as the outbound communications to be sent during the first time period;

determining a second time period during which the number of inbound communications is expected to be received by the contact center based on sending the number of outbound communications during the first time period; and during the first time period:
- determining a present capacity of the contact center by a computer processor, wherein the present capacity is with respect to one or more resources that are to be used during the second time period to handle the number of inbound communications expected to be received by the contact center;
- determining by the computer processor whether the present capacity is at an acceptable level to send the number of outbound communications, wherein the present capacity being at the acceptable level comprises a capacity with respect to the one or more resources required to handle the number of inbound communications expected to be received as a result of sending the number of outbound communications minus the present capacity being less than a threshold value; and
- in response to the present capacity being at the acceptable level, sending the number of outbound communications using a contact device.

2. The method of claim 1, wherein at least a portion of the first time period and a portion of the second time period overlap.

3. The method of claim 1, wherein the outbound communications comprise SMS text messages or e-mails.

4. The method of claim 1, wherein the expected inbound communications comprise at least one of SMS text messages, telephone calls, and e-mails.

5. The method of claim 1 further comprising the steps of, during the first time period and in response to the present capacity not being at the acceptable level:
- setting a second number of outbound communications to send during the first time period, wherein the second number of outbound communications is lower than the number of outbound communications;
- determining a second number of inbound communications expected to be received as a result of sending the second number of outbound communications based on the historical data of the outbound communications sent during the prior time period;
- determining the present capacity of the contact center by the computer processor;
- determining by the computer processor whether the present capacity is at the acceptable level to send the second number of outbound communications, wherein the present capacity being at the acceptable level comprises a capacity with respect to the one or more resources required to handle the second number of inbound communications expected to be received as a result of sending the second number of outbound communications minus the present capacity being less than the threshold value; and
- in response to the present capacity being at the acceptable level, sending the second number of outbound communications using the contact device.

6. The method of claim 1, wherein the one or more resources comprise one or more of agents, trunks, hardware ports, memory, processing capacity, hardware-related licenses, software-related licenses, and bandwidth.

7. The method of claim 1, wherein the second time period is also based on the historical data of the outbound communications sent during the prior time period.

8. A non-transitory, computer-readable medium comprising computer-executable instructions for pacing outbound communications that generate inbound communications for a contact center, that when executed cause at least one computer processor to:
- set a number of outbound communications to send during a first time period;
- determine a number of inbound communications expected to be received as a result of sending the number of outbound communications based on historical data of outbound communications sent during a prior time period to generate inbound communications in which the outbound communications found in the historical data were sent using a same channel of communication as the outbound communications to be sent during the first time period;
- determine a second time period during which the number of inbound communications is expected to be received by the contact center based on sending the number of outbound communications during the first time period; and
- during the first time period:
  - determine a present capacity of the contact center, wherein the present capacity is with respect to one or more resources that are to be used during the second time period to handle the number of inbound communications expected to be received by the contact center;
  - determine whether the present capacity is at an acceptable level to send the number of outbound communications, wherein the present capacity being at the acceptable level comprises a capacity with respect to the one or more resources required to handle the number of inbound communications expected to be received as a result of sending the number of outbound communications minus the present capacity being less than a threshold value; and
  - in response to the present capacity being at the acceptable level, facilitate sending the number of outbound communications.

9. The non-transitory, computer-readable medium of claim 8, wherein at least a portion of the first time period and a portion of the second time period overlap.

10. The non-transitory, computer-readable medium of claim 8, wherein the outbound communications comprise SMS text messages or e-mails.

11. The non-transitory, computer-readable medium of claim 8, wherein the expected inbound communications comprise at least one of SMS text messages, telephone calls, and e-mails.

12. The non-transitory, computer-readable medium of claim 8, wherein the computer-executable instructions further cause the at least one computer processor to, during the first time period an in response to the present capacity not being at the acceptable level:
- set a second number of outbound communications to send during the first time period, wherein the second number of outbound communications is lower than the number of outbound communications;

determine a second number of inbound communications expected to be received as a result of sending the second number of outbound communications based on the historical data of the outbound communications sent during the prior time period;

determine the present capacity of the contact center;

determine whether the present capacity is at the acceptable level to send the second number of outbound communications, wherein the present capacity being at the acceptable level comprises a capacity with respect to the one or more resources required to handle the second number of inbound communications expected to be received as a result of sending the second number of outbound communications minus the present capacity being less than the threshold value; and in response to the present capacity being at the acceptable level, facilitate sending the second number of outbound communications.

13. The non-transitory, computer-readable medium of claim 8, wherein the one or more resources comprise one or more of agents, trunks, hardware ports, memory, processing capacity, hardware-related licenses, software-related licenses, and bandwidth.

14. The non-transitory, computer-readable medium of claim 8, wherein the second time period is also based on the historical data of the outbound communications sent during the prior time period.

15. A system for pacing outbound communications that generate inbound communications for a contact center, the system comprising:

at least one computer processor configured to:
set a number of outbound communications to send during a first time period;
determine a number of inbound communications expected to be received as a result of sending the number of outbound communications based on historical data of outbound communications sent during a prior time period to generate inbound communications in which the outbound communications found in the historical data were sent using a same channel of communication as the outbound communications to be sent during the first time period;
determine a second time period during which the number of inbound communications is expected to be received by the contact center based on sending the number of outbound communications during the first time period; and
during the first time period:
determine a present capacity of the contact center, wherein the present capacity is with respect to one or more resources that are to be used during the second time period to handle the number of inbound communications expected to be received by the contact center; and
determine whether the present capacity is at an acceptable level to send the number of outbound communications, wherein the present capacity being at the acceptable level comprises a capacity with respect to the one or more resources required to handle the number of inbound communications expected to be received as a result of sending the number of outbound communications minus the present capacity being less than a threshold value; and a contact device configured to send the number of outbound communications during the first time period in response to the present capacity being at the acceptable level.

16. The system of claim 15, wherein at least a portion of the first time period and a portion of the second time period overlap.

17. The system of claim 15, wherein the outbound communications comprise SMS text messages or e-mails.

18. The system of claim 15, wherein the expected inbound communications comprise at least one of SMS text messages, telephone calls, and e-mails.

19. The system of claim 15, wherein:
the at least one computer process is further configured to, during the first time period and in response to the present capacity not being at the acceptable level:
set a second number of outbound communications to send during the first time period, wherein the second number of outbound communications is lower than the number of outbound communications;
determine a second number of inbound communications expected to be received as a result of sending the second number of outbound communications based on the historical data of the outbound communications sent during the prior time period;
determine the present capacity of the contact center; and
determine whether the present capacity is at the acceptable level to send the second number of outbound communications, wherein the present capacity being at the acceptable level comprises a capacity with respect to the one or more resources required to handle the second number of inbound communications expected to be received as a result of sending the second number of outbound communications minus the present capacity being less than the threshold value; and
the contact device is further configured to send the second number of outbound communications during the first time period in response to the present capacity being at the acceptable level.

20. The system of claim 15, wherein the one or more resources comprise one or more of agents, trunks, hardware ports, memory, processing capacity, hardware-related licenses, software-related licenses, and bandwidth.

21. The system of claim 15, wherein the second time period is also based on the historical data of the outbound communications sent during the prior time period.

* * * * *